United States Patent

Maclean et al.

[11] Patent Number: 4,557,518
[45] Date of Patent: Dec. 10, 1985

[54] MODULAR CONCEPT IN CAMPER TRAILER HAVING PORTABLE CORRIDOR

[76] Inventors: Ewen M. Maclean; George Spector, both c/o 3615 Woolworth Bldg., 233 Broadway, New York, N.Y. 10007

[21] Appl. No.: 661,411

[22] Filed: Feb. 25, 1976

[51] Int. Cl.[4] .............................................. B60P 3/34
[52] U.S. Cl. .................................... 296/156; 296/165; 296/172; 296/176; 105/8 R
[58] Field of Search ......................... 105/8 R, 15, 16; 296/165, 166, 172, 173, 156

[56] References Cited

U.S. PATENT DOCUMENTS

| | | | |
|---|---|---|---|
| 2,193,156 | 3/1940 | Antoine | 105/8 R |
| 2,913,775 | 11/1959 | Sailor | 296/172 |
| 3,257,760 | 6/1966 | Calthorpe | 296/165 |
| 3,602,545 | 8/1971 | Lindenbauer | 105/8 R |
| 3,811,723 | 5/1974 | Anderson | 296/172 |
| 3,996,859 | 12/1976 | Heisler et al. | 105/15 |

FOREIGN PATENT DOCUMENTS 2398639  3/1979  France ............................... 296/165

*Primary Examiner*—Richard A. Bertsch

[57] ABSTRACT

A concept in camper trailers wherein a plurality of individual camper trailer units may be enjoined together when parked in a trailer camp so to form a dwelling of more variable floor plan shape; each camper trailer having a side door and a rear opening which are variable connected between the units by means of a portable corridor attachable therebetween.

2 Claims, 7 Drawing Figures

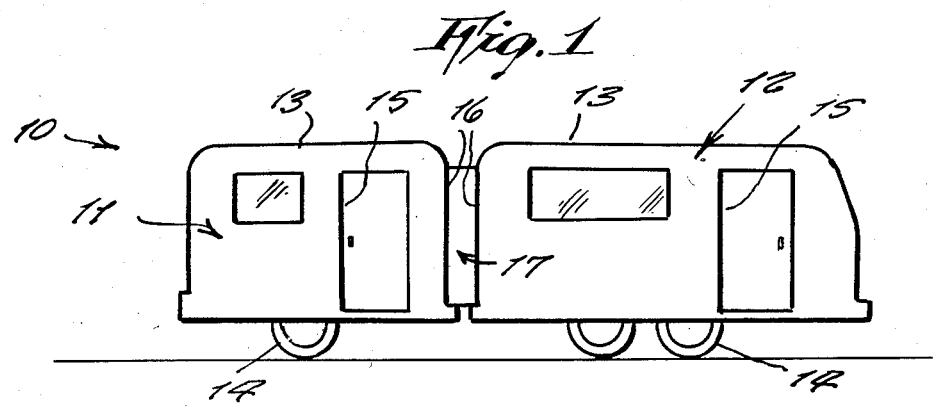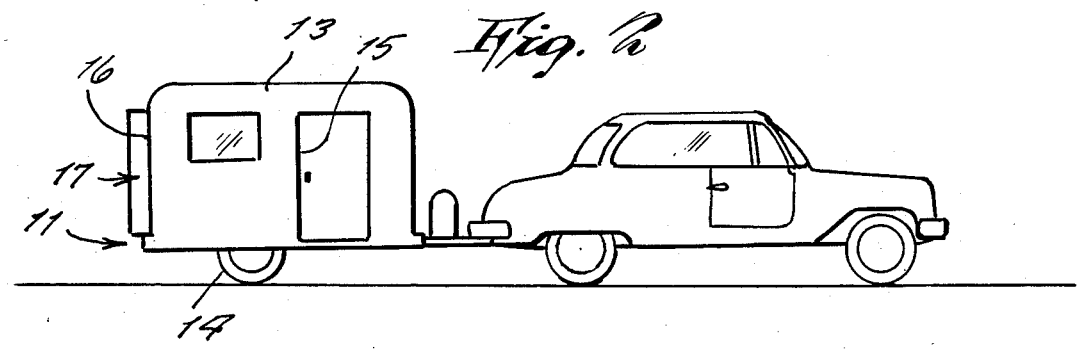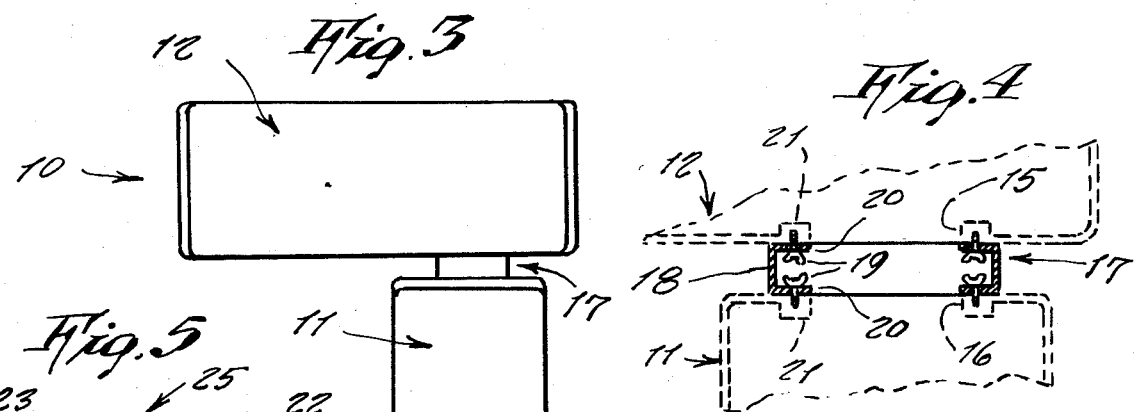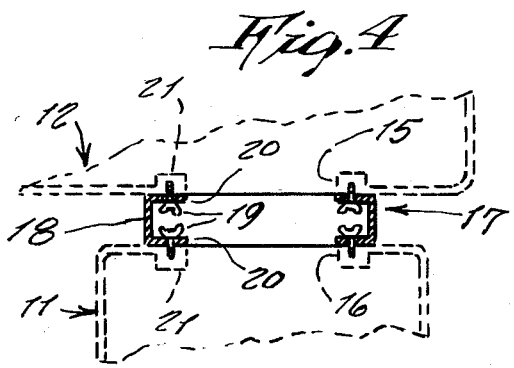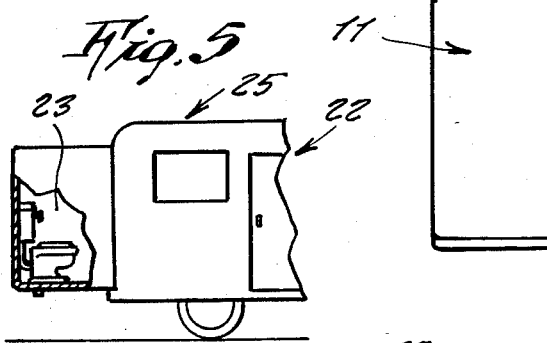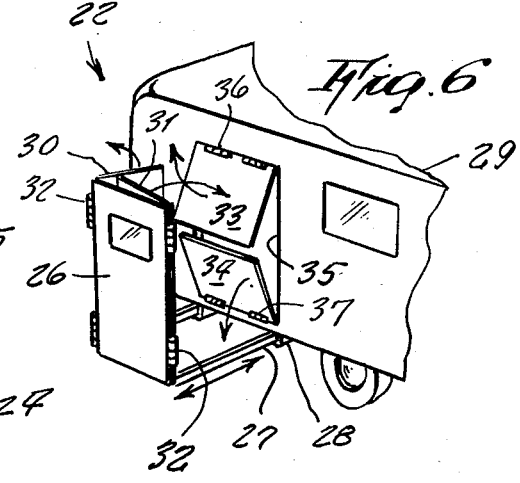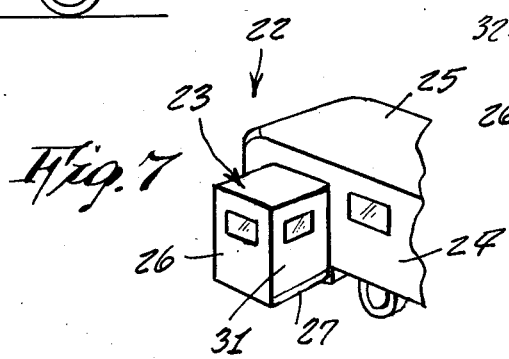

MODULAR CONCEPT IN CAMPER TRAILER HAVING PORTABLE CORRIDOR

SPECIFICATION

This invention relates generally to camper trailers.

It is generally well known among camper trailer enthusiasts that a conventional camper trailer is of rectangular floor plan shape so to be practical when travelling on a highway but which when parked for use as a dwelling lacks the floor plan variety of a conventional home, so that it is less satisfying particularly on extended times of residency when staying in one spot for a number of days or weeks. This situation is accordingly in want of an improvement.

Therefore, it is a principal object of the present invention to provide a camper trailer that incorporates a modular concept so that it can be variably assembled in different floor plan shapes.

Another object is to provide a modular concept in camper trailers wherein the same is constructed of several independent camper trailer units all of which can be towed behind an automobile on extended time trips or else only one may be taken for a short weekend trip.

Still another object is to provide a modular concept in camper trailers wherein each unit includes at least one side door and a rear opening, and a portable corridor is readily connectable between any door or opening of either unit so that the camper trailer can be made in an L-shape.

Other objects are to provide a modular concept in camper trailers which is simple in design, inexpensive to manufacture, rugged in construction, easy to use and efficient in operation.

These and other objects will be readily evident upon a study of the following specification and the accompanying drawing wherein:

FIG. 1 is a side view of two camper trailer units hitched end to end together by means of the portable corridor so to make larger living quarters.

FIG. 2 is a side view of a camper trailer unit in tow by a car.

FIG. 3 is a top view of two camper trailers connected together into an L-shape by means of the portable corridor.

FIG. 4 is an enlarged cross sectional top view of the corridor showing the wing nut securement thereof to the camper trailers shown in FIG. 3.

FIG. 5 shows a modified design of portable device that serves as a bathroom.

FIG. 6 is a view of a modified design of the invention wherein panels normally folded in an opening in a side wall fold or slide out so to form the extra room shown in FIG. 7, and which in a folded away position are flush with the wall so to not take up any space within the trailer.

FIG. 7 shows the structure of FIG. 6 in folded outward position.

Referring now to the drawing in detail, and more particularly to FIGS. 1 through 4 thereof at this time, the reference numeral 10 represent a modular concept in camper trailers according to the present invention wherein the camper trailer is comprised of several camper trailer units 11 and 12. While the drawing illustrates only a modular concept of only two units, it should be understood that it could consist of three or even more units.

In the present invention each unit includes a box-like body 13 and chassis mounted upon wheels 14, and each unit includes at least one side door 15 and an end or back opening 16. Additionally, a portable corridor 17 is provided for detachable connection between two units either by their side doors or end openings.

The portable corridor consists of a four-sided, metal frame 18 in which each side is of channel shape so that winged bolts 19 can be fitted manually (without need of tools) through both flanges 20 of the channel, the winged bolts screwing into threaded openings provided in a frame 21 around each side door or end opening. Thus the corridor is quickly and easily attached for allowing persons to walk between the units while sheltered from outside weather.

As shown in FIGS. 1 and 2, either a single unit can be towed behind an automobile or else several units may be attached together in tandem for towing.

In FIG. 5, a portable unit 22 of larger size than a corridor 17 can be mountable in either side door or end opening by use of wing bolts therebetween and the frames 21. Thus side doors or end openings, not used for communication between units are utilized for additional convenience.

In another design of the invention, not shown, a separate unit could be included which serves either as a bathroom or as an extra bedroom.

Referring now to FIGS. 6 and 7, another design of the invention 22 shows an extra room 23 being able to be formed along a side wall 24 of the trailer 25, so that when parked, extra interior space for living is provided. This is accomplished by first pulling sidewardly out a panel 26 which normally is flush on its outer side with outer side of the side wall 24 so to be streamlined therewith during travel on a highway. The lower end of panel 26 is fixedly integral with bars 27 that slide in channel rails 28 so to extend underneath the trailer body 29. After the panel is pulled out, then side panels 30 and 31 are swinged out on hinged 32 at the side edges of panel 26. Also top panel 33 and bottom panel 34 are pivoted outward from vertical position in opening 35 by means of hinges 36 and 37 respectively, so to form a roof and a floor for the room 23. All panels are locked together by wing bolts so to form a rigid structure. Thus a modified design is provided which may be used in addition to the structure described in FIGS. 1 to 5.

In camper trailers of larger sizes, more than one door may be provided on each side so that instead of creating L-shaped floor plan assemblies, they may be T-shaped or otherwise.

Thus various designs of the invention are indicated.

While various changes may be made in the detail construction, it is understood that such changes will be within the spirit and scope of the present invention as is defined by the appended claims.

What is claimed is:

1. A camper trailer, comprising a trailer unit having a portal in combination with means attachable to the unit forming an extension to said unit via said portal, said extension providing additional useable living space, wherein said means comprise a corridor assembly having spaced opposite sides and a passageway therethrough in further combination with a second trailer unit having a portal, said assembly being detachably mounted to and between said units with the passageway aligned with said portals, wherein said corridor assembly comprises opposing U-shaped channels with spaced aligned transverse openings formed through opposite transverse flange portions of the channels, said portals including similar opposing frames surrounding said openings adapted to be secured to said channels with said flanges abutting the outer surfaces of said frames.

2. The combination of claim 1, including a second extension comprising a horizontal panel with spaced bars mounted transversely slideably on channel rails on said unit adjacent to and aligned with said portal including a door assembly vertically secured to an outer end of said panel having opposing walls pivoted to opposite ends of said door adapted to form side walls of the extension, further including pivotal panels secured to portal edges above and below said portal adapted to form roof and floor of the extension.

* * * * *